Jan. 16, 1968     T. M. CAMPBELL     3,363,993
METHOD AND SYSTEM FOR USING THE CARBON
MONOXIDE CONTENT OF GASES
Original Filed Aug. 3, 1964
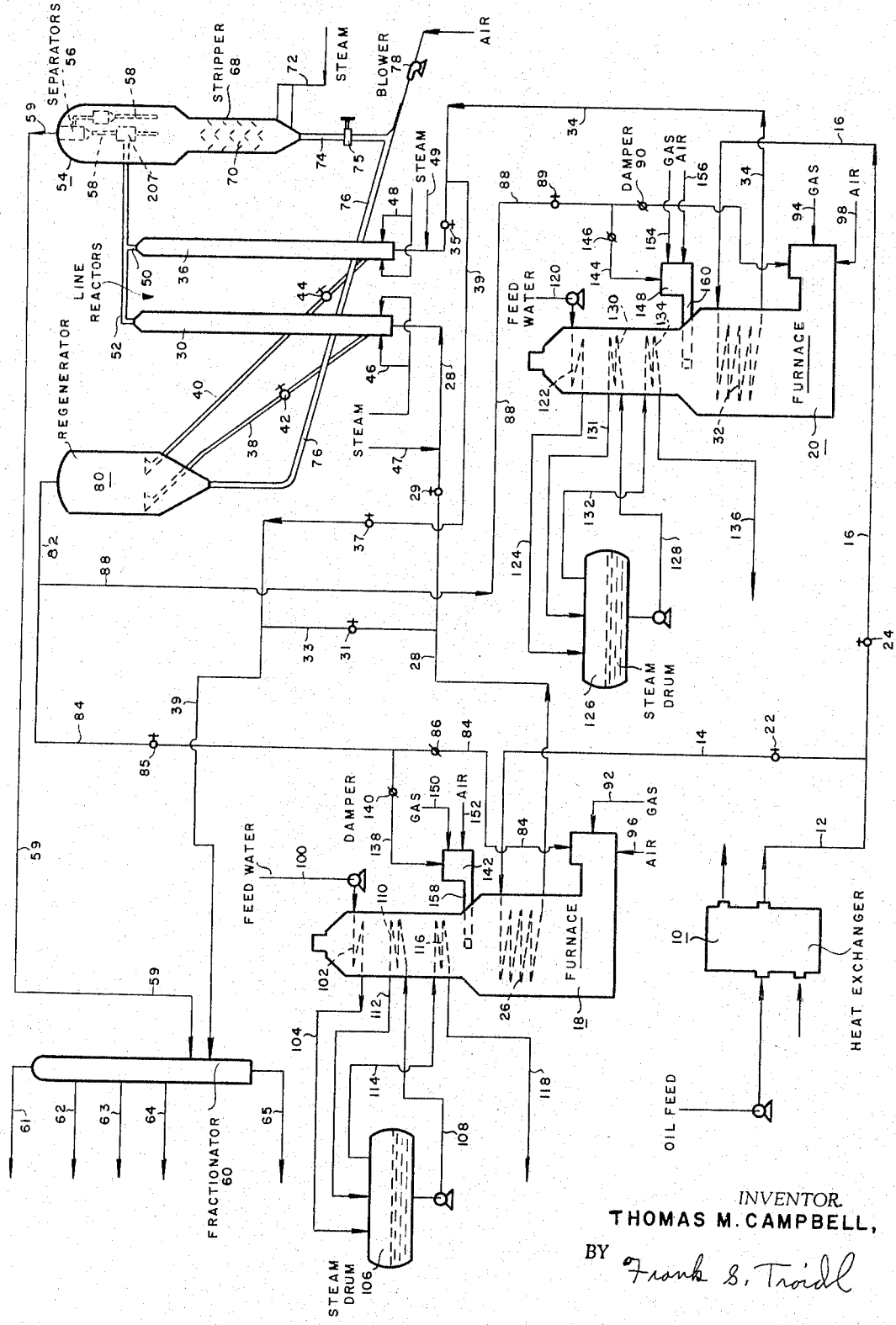
INVENTOR.
THOMAS M. CAMPBELL,
BY Frank S. Troidl
ATTORNEY.

3,363,993
METHOD AND SYSTEM FOR USING THE CARBON MONOXIDE CONTENT OF GASES

Thomas M. Campbell, Baytown, Tex., assignor, by mesne assignments, to Esso Research and Engineering Company, Elizabeth, N.J., a corporation of Delaware
Continuation of application Ser. No. 386,904, Aug. 3, 1964. This application Dec. 2, 1966, Ser. No. 598,880
1 Claim. (Cl. 23—288)

This application is a continuation of application Ser. No. 386,904, filed Aug. 3, 1964, and now abandoned.

This invention relates to methods and systems for using the carbon monoxide content of gases. More particularly, this invention is a method and system for utilizing the fuel value of the carbon monoxide content of the flue gas from a catalyst regenerator used in the catalytic cracking of petroleum as well as the sensible heat of the flue gas.

In the catalytic cracking of petroleum, an oil feed may be preheated before it is fed to the catalytic cracking unit. The preheating step often requires the use of a large amount of natural gas which when combusted provides the heat necessary to preheat the oil-feed. The need for this natural gas increases the overall cost of catalytically cracking the oil feed.

In addition to regenerating the catalyst, the catalyst regenerator which forms a part of many catalytic cracking systems produces a large amount of flue gas. This flue gas may contain from 5 to 10 mol percent carbon monoxide on a dry basis. This invention makes use of the fuel content of the carbon monoxide to preheat the oil feed. The use of the fuel content of the carbon monoxide in the flue gas substantially decreases the required amount of natural gas.

Briefly described, the new system includes at least one carbon monoxide burning furnace. The oil feed is fed through oil heating coils located in the carbon monoxide burning furnace. A flue gas line extends from the catalyst regenerator to the carbon monoxide burning furnace. The carbon monoxide is combusted in the furnace, and the fuel value of the carbon monoxide as well as sensible heat of the flue gas is used to heat the oil flowing through the heating coils located in the carbon monoxide burning furnace.

The sensible and combustion heat content of the flue gas fed to the carbon monoxide burning furnace is often greater than the heat content necessary to preheat the oil to a temperature within the desired preheat temperature range. Accordingly, an auxiliary carbon monoxide burning heater may be included in the system. A gas duct leads from the auxiliary carbon monoxide burning heater into the carbon monoxide burning furnace at a point above the heating coils through which the oil flows. A bypass line leading from the main flue gas line to the auxiliary carbon monoxide burning heater is provided for feeding that flue gas which is not needed in the main carbon monoxide burning furnace to the auxiliary carbon monoxide burning heater.

Steam heating coils may be provided in the main carbon monoxide burning furnace. The sensible heat remaining in the gases produced in the main carbon monoxide burning furnace, which sensible heat remains after the oil feed in the oil heating coils has been heated to the desired temperature, is used to produce high pressure superheated steam from the steam heating coils.

There are certain advantages in utilizing two main carbon monoxide burning furnaces and two auxiliary carbon monoxide burning heaters. These advantages include more operation flexibility and the minimizing of the effect of furnace downtimes to accomplish boiler inspections and other maintenance procedures.

The invention, as well as its many advantages, may be further understood by reference to the following detailed description and single figure which is a schematic flow diagram illustrating the invention as used in a fluid catalytic cracking unit.

Referring to the figure, the oil feed is pumped to indirect heat exchanger 10. The oil feed is heated within the indirect heat exchanger 10 to a temperature ranging from 500° F. to 700° F. The indirectly heated oil feed is conducted through oil feed line 12 and branch lines 14 and 16 to a first main carbon monoxide burning furnace 18 and a second main carbon monoxide burning furnace 20. The flow of oil feed through branch line 14 and the flow of oil feed through branch line 16 are controlled by valve 22 and valve 24, respectively. The oil fed through branch line 14 to main carbon monoxide burning furnace 18 flows through oil heating coils 26 located within the main carbon monoxide burning furnace 18. Within the oil heating coils 26, the oil feed is heated to a temperature ranging from 700° F. to 850° F. and conducted through oil output line 28 and oil diversion valve 29 to a transfer line reactor 30. If desired, the oil flowing through oil output line 28 may be diverted from the reactor 30 to the fractionator 60 by means of valve 31 in line 33.

The oil fed through branch line 16 to main carbon monoxide burning furnace 20 flows through oil heating coils 32 located within the main carbon monoxide burning furnace 20. The oil flowing through oil heating coils 32 is heated to the temperature ranging from 700° F. to 850° F. and conducted through oil output line 34 and oil diversion valve 35 to transfer line reactor 36. If desired, the oil flowing through oil output line 34 may be diverted from the reactor 36 to the fractionator 60 by means of valve 37 in line 39.

Catalyst is introduced into the transfer line reactor 30 and transfer line reactor 36 by means of line 38 and line 40, respectively, controlled by valve 42 and valve 44, respectively. Steam inlet lines 46 are provided for the introduction of steam into the reactor 30 to fluidize the catalyst introduced through the line 38. Steam lines 48 are provided for the introduction of steam into the reactor 36 to fluidize the catalyst introduced through the line 40. When the oil is diverted from the reactors to the fractionator 60, additional steam is introduced through steam line 47 and steam line 49 to reactor 30 and reactor 36, respectively, to keep the catalyst fluidized.

The outlet 50 from transfer line reactor 36 connects to the outlet 52 from transfer line reactor 30. The outlet 52 discharges into a vessel 54 wherein a rough separation using a rough-cut cyclone 207 is made between the catalyst and the cracked product, the catalyst fines being further separated from the cracked product by a cyclone separation means 56 provided with dip-legs 58 which discharge the catalyst into the vessel 54. The crude products are discharged from the vessel 54 by way of line 59 and are introduced thereby into a fractionator 60 which may be a plurality of fractional distillation zones suitably equipped with all the auxiliary equipment usually associated with commercial distillation towers. Fractionator 60 is provided with lines 61, 62, 63, 64, and 65 by way of which the various cracked products may be withdrawn.

The catalyst discharged by line 52 and by dip-legs 58 flows downwardly into a stripper section 68 of vessel 54, the stripper section being provided with baffle means 70 and with a steam inlet line 72 to provide stripping steam for contact with the downwardly moving catalyst to remove volatiles, such as vaporizable hydrocarbons, therefrom. The catalyst, substantially free of volatiles, is discharged from the stripper 68 by line 74 and through level controlling valve 75 and introduced thereby into line 76 wherein it is mixed with air by manipulation of air blowers 78. The air carries the catalyst and air mixture through line 76 into a regenerator 80 wherein the catalyst is regenerated by burning off any remaining volatiles and the nonvolatile materials, such as coke, to regenerate the catalyst for reuse. The regenerated catalyst is withdrawn from regenerator 80 by line 38 and line 40 controlled by valve 42 and valve 44, respectively, and introduced thereby into reactor 30 and reactor 36, respectively.

The flue gases generated in the catalyst regenerator 80 are conducted from the catalyst regenerator 80 by means of flue gas line 82. The flue gas may have a temperature ranging from 900° F. to 1400° F. The flue gas is divided into two flue gas streams by means of branch gas line 84 controlled by valve 85 and branch gas line 88 controlled by valve 89. Branch gas line 84 is connected to main carbon monoxide burning furnace 18 and auxiliary carbon monoxide burning heater 142, and branch gas line 88 is connected to main carbon monoxide burning furnace 20 and auxiliary carbon monoxide burning heater 148.

This process combusts all the regenerator flue gas flowed into each of the main carbon monoxide burning furnaces 18 and 20 at a temperature ranging from 1200° F. to 2300° F. to take advantage of the fuel content of the catalyst regenerator flue gas. In order to minimize the amount of supplemental natural gas, other refinery gas, or oil fuel, the carbon monoxide containing flue gas is introduced into the combustors without being cooled (between 900° F. and 1200° F.) and then heated to the combustion temperature ranging from 1200° F. to 2300° F. with the supplemental fuel. This particular system reduces the amount of supplemental fuel necessary for a considerable oil preheat input. The supplemental fuel necessary ranges from 0% to 15% of the total heat input. The supplemental fuel is introduced into main carbon monoxide burning furnace 18 and main carbon monoxide burning furnace 20 by means of gas line 92 and gas line 94, respectively. Air is introduced into the main carbon monoxide burning furnace 18 and the main carbon monoxide burning furnace 20 by means of line 96 and line 98, respectively.

The regenerator flue gas normally contains 5 to 10 mol percent carbon monoxide on a dry basis which, at the proper conditions, can be burned to form carbon dioxide. The combustion zone conditions necessary for the stable combustion of the carbon monoxide are the high temperatures ranging from 1200° F. to 2300° F. and air in sufficient quantity to provide a slight excess above the stoichiometric requirement. The small amount of supplemental fuel is needed to raise the flue gas from its regenerator exit temperature to the combustion temperature. Air is supplied to the combustion chamber by blowers. This results in heater pressures of several inches of water gauge.

The heat resulting from the combustion in the lower portion of each of the main carbon monoxide burning furnaces 18 and 20 enters the oil heating section of each main carbon monoxide burning furnace. This heat raises the oil flowing through oil heating coils 26 and 32 of furnaces 18 and 20, respectively.

The gas leaving the oil heating section of each of the furnaces 18 and 20 has a temperature ranging from 800° F. to 1400° F. Thus, a great deal of sensible heat still remains in the gases which flow from the oil heating section of each of the furnaces. This sensible heat is utilized to generate high pressure superheated steam.

Feedwater is pumped through line 100 to the coils 102 in the upper section of main carbon monoxide burning furnace 18. The feedwater is heated as it flows through coils 102 with the output line 104 extending to a steam drum 106. The feedwater fed to the coils 102 through line 100 has a pressure ranging from 600 p.s.i.g. to 750 p.s.i.g. The temperature of the heated water flowing from coils 102 through line 104 ranges from 480° F. to 510° F., and the pressure ranges from 600 p.s.i.g. to 750 p.s.i.g. Water having a temperature ranging from 480° F. to 510° F. and a pressure ranging from 600 p.s.i.g. to 750 p.s.i.g. is flowed from the steam drum 106 through line 108 to the coils 110 in main carbon monoxide burning furnace 18. The water is heated in coils 110 and exits from the furnace 18 through line 112 extending to the steam drum 106. The temperature of the water and steam flowing through line 112 ranges from 480° F. to 510° F., and the pressure ranges from 600 p.s.i.g. to 750 p.s.i.g. A certain amount of steam ranging from 0 to 30 weight percent also flows through line 112.

Steam at a temperature ranging from 480° F. to 510° F. and a pressure ranging from 600 p.s.i.g. to 750 p.s.i.g. is flowed from the steam drum 106 through line 114 to the coils 116 of the main carbon monoxide burning furnace 18. The steam is superheated as it flows through the coils 116 and exits from the furnace 18 through line 118. Steam having a temperature ranging from 600° F. to 800° F. and pressure ranging from 600 p.s.i.g. to 750 p.s.i.g. is thus generated by the use of the sensible heat remaining in the gases flowing from the oil heating section of the main carbon monoxide burning furnace 18. Similarly, feedwater is pumped through line 120, coils 122, and line 124 to the steam drum 126. Heated water is also pumped from steam drum 126 through line 128, coils 130, and line 131 back to steam drum 126. Steam exits from steam drum 126 through line 132, coils 134, and line 136 to provide the high pressure superheated steam. The temperature and pressure ranges within the lines and coils are the same as the temperature and pressure ranges within the corresponding lines and coils associated with heater 18.

As formerly stated, it often occurs that more catalyst regenerator flue gas is generated by the catalyst regenerator 80 than is necessary to preheat the oil feed conducted through the main carbon monoxide burning furnaces. This excess flue gas can be utilized by at least one auxiliary carbon monoxide burning heater. More flexibility is provided if a second auxiliary carbon monoxide burning heater is used.

As shown in the figure, a bypass line 138 controlled by damper 140 interconnects the flue gas line 84 and the first auxiliary carbon monoxide burning heater 142. Damper 86 provides additional control. Similarly, a bypass line 144 controlled by damper 146 interconnects the flue gas line 88 and the second auxiliary carbon monoxide burning heater 148. Damper 90 provides additional control. Supplemental natural gas and air are fed to the first auxiliary carbon monoxide burning heater 142 by means of gas line 150 and air line 152, respectively. Supplemental natural gas and air are fed to the second auxiliary carbon monoxide burning heater 148 by means of gas line 154 and air line 156, respectively.

The gases are combusted in each of the auxiliary heaters 142 and 148 to provide gases ranging from 1200° F. to 2300° F. The gases are conducted by ducts 158 and ducts 160 from auxiliary heaters 142 and 148, respectively, into furnaces 18 and 20, respectively, at a point above the oil heating section and below the steam generating section.

The table below shows typical process data for a typical fluid catalytic cracking system using two main carbon monoxide burning furnaces and two auxiliary carbon monoxide burning heaters. Column A includes data relating to main furnace 18 and auxiliary heater 142. Column B includes data relating to main furnace 20 and auxiliary heater 148.

TABLE

| | A | B |
|---|---|---|
| 1. CO Gas Flow, lb./hr. | 229,000 | 158,500 |
| 2. CO Gas Temperature, °F | 1,050 | 1,050 |
| 3. CO Gas Composition, wt percent: | | |
| (a) $N_2$ | 65.44 | 65.44 |
| (b) $O_2$ | 0.19 | 0.19 |
| (c) CO | 8.20 | 8.20 |
| (d) $CO_2$ | 12.88 | 12.88 |
| (e) $H_2O$ | 13.29 | 13.29 |
| 4. Quantity of Auxiliary Fuel, lb./hr. (N.H.V.=20,880 B.t.u./lb.) | 985 | 680 |
| 5. Quantity of Air for Combustion, lb./hr.: | | |
| (a) CO Gas | 52,900 | 36,500 |
| (b) Auxiliary Fuel | 33,010 | 22,800 |
| (c) Total | 85,910 | 59,300 |
| 6. Total Products of Combustion to Oil Coil, lb./Hr. | 315,895 | 218,480 |
| 7. Heat Input to Oil Coil, B.t.u./hr.: | | |
| (a) CO Gas | 144,500,000 | 99,800,000 |
| (b) Auxiliary Fuel | 20,600,000 | 14,200,000 |
| (c) Total | 165,100,000 | 114,000,000 |
| 8. Bypass CO Gas Burner: | | |
| (a) CO Gas Flow Rate, lb./hr. | 40,000 | 27,700 |
| (b) CO Gas Temperature, °F | 1,050 | 1,050 |
| (c) CO Gas Composition, wt. percent | See | Above |
| (d) Quantity of Auxiliary Fuel, lb./hr. (N.H.V.=20,800 B.t.u./lb.) | 172 | 119 |
| (e) Quantity of Air for Combustion, lb./hr.: | | |
| (1) CO Gas | 9,250 | 6,400 |
| (2) Auxiliary Fuel | 5,760 | 4,000 |
| (3) Total | 15,010 | 10,400 |
| (f) Heat Input, B.t.u./hr.: | | |
| (1) CO Gas | 25,200,000 | 17,450,000 |
| (2) Auxiliary Fuel | 3,600,000 | 2,480,000 |
| (3) Total | 28,800,000 | 19,930,000 |
| 9. Total Heat Input, B.t.u./hr | 193,900,000 | 133,930,000 |
| 10. Oil Charge Coil: | | |
| (a) Inlet Temperature, °F | 600 | 600 |
| (b) Outlet Temperature, °F | 775 | 775 |
| (c) Inlet Pressure, p.s.i.g | 125 | 125 |
| (d) Outlet Pressure, p.s.i.g | 50 | 50 |
| (e) Inlet Vaporization, wt. percent | 0 | 0 |
| (f) Outlet Vaporization, wt. percent | 23.0 | 23.0 |
| (g) Throughput, lb./hr | 432,000 | 299,000 |
| 11. Economizer Section: | | |
| (a) Inlet Temperature, °F | 212 | 212 |
| (b) Outlet Temperature, °F | 493 | 493 |
| (c) Inlet Pressure, p.s.i.g | 640 | 640 |
| (d) Outlet Pressure, p.s.i.g | 630 | 630 |
| (e) Inlet Vaporization, wt. percent | 0 | 0 |
| (f) Outlet Vaporization, wt. percent | 0 | 0 |
| (g) Throughput, lb./hr | 78,500 | 54,300 |
| 12. Steam Generator Section: | | |
| (a) Inlet Temperature, °F | 493 | 493 |
| (b) Outlet Temperature °F | 493 | 493 |
| (c) Inlet Pressure, p.s.i.g | 655 | 655 |
| (d) Outlet Pressure, p.s.i.g | 630 | 630 |
| (e) Inlet Vaporization, wt. percent | 0.0 | 0.0 |
| (f) Outlet Vaporization, wt. percent | 20 | 20 |
| (g) Throughput, lb./hr | 372,000 | 258,000 |
| 13. Steam Superheater Section: | | |
| (a) Inlet Temperature, °F | 493 | 493 |
| (b) Outlet Temperature, °F | 750 | 750 |
| (c) Inlet Pressure, p.s.i.g | 630 | 630 |
| (d) Outlet Pressure, p.s.i.g | 625 | 625 |
| (e) Inlet Vaporization, wt. percent | 100 | 100 |
| (f) Outlet Vaporization, wt. percent | 100 | 100 |
| (g) Throughput, lb./hr | 74,800 | 51,600 |
| 14. Heat Absorption, B.t.u./hr.: | | |
| (a) Oil | 65,000,000 | 45,000,000 |
| (b) Economizer | 23,000,000 | 16,000,000 |
| (c) Steam Generator | 54,000,000 | 37,000,000 |
| (d) Steam Superheater | 13,000,000 | 9,000,000 |
| (e) Total | 155,000,000 | 107,000,000 |
| 15. Flue Gas Temperatures, °F.: | | |
| (a) Combustor | 1,800 | 1,800 |
| (b) Leaving Oil Section | 1,170 | 1,170 |
| (c) Entering Steam Section | 1,280 | 1,280 |
| (d) Entering Stack | 445 | 445 |

In operation, the oil feed is preheated by indirect heat exchanger 10 and then divided into two portions with one portion being further preheated in main carbon monoxide burning furnace 18 and the other portion being further preheated in main carbon monoxide burning furnace 20. The regenerator flue gas is used to preheat the oil feed flowing through the main carbon monoxide burning furnaces. The preheated oil from the main furnaces 18 and 20 is fed through the fluid catalytic cracking units including transfer line reactors 30 and 36.

The heat provided in the main furnaces 18 and 20 is also utilized to provide high pressure superheated steam which exits from line 118 and line 136 of main furnaces 18 and 20.

Any excess flue gas from regenerator 80 over that required to heat the oil to the desired temperature of from 700° F. to 850° F. may be bypassed to one or both of the auxiliary carbon monoxide burning heaters 142 and 148. The heat in the auxiliary heaters 142 and 148 is utilized to provide additional high pressure superheated steam which also exits through lines 118 and 136, respectively.

This new system and process provides a way to supply a desired flue gas rate to the furnaces and heaters even though the composition and heating value of the flue gas from the regenerator may vary. The regenerator pressure is undisturbed by the preheat requirements of the oil. Hence, this pressure can also be used to help manipulate the air rate on air blowers 78. It, therefore, is a valuable way of controlling the heat without upsetting the unit.

I claim:

1. In a system for use in the catalytic cracking of petroleum:
   a catalyst regenerator;
   an indirect heat exchange preheater;
   a first main carbon monoxide burning furnace;
   a second main carbon monoxide burning furnace;
   a first auxiliary carbon monoxide burning heater;
   a second auxiliary carbon monoxide burning heater;
   an oil conduit extending from the indirect heat exchange preheater;
   a first oil line and a second oil line branching from the oil conduit for feeding oil into the central areas of the first main carbon monoxide burning furnace and the second main carbon monoxide burning furnace, respectively;
   a flue gas conduit connected to the catalyst regenerator;
   a first flue gas line and a second flue gas line branching from the flue gas conduit and extending into the lower areas of the first main carbon monoxide burning furnace and the second main carbon monoxide burning furnace, respectively;
   a first bypass line interconnecting the first flue gas line and the first auxiliary carbon monoxide burning heater;
   a second bypass line interconnecting the second flue gas line and the second auxiliary carbon monoxide burning heater;
   means adapted to control the flow of flue gas to the two main carbon monoxide burning furnaces and the two auxiliary carbon monoxide burning heaters;
   heating coils located in the upper area of each of the main carbon monoxide burning furnaces;
   means for discharging the combustion products from the first auxiliary carbon monoxide burning heater into the first main carbon monoxide burning furnace at a point below the heating coils and above the central area;
   means for discharging the combustion products from the second auxiliary carbon monoxide burning heater into the second main carbon monoxide burning furnace at a point below the heating coils and above the central area;
   and means for feeding water to said heating coils for the production of steam therefrom.

References Cited

UNITED STATES PATENTS 2,330,462  9/1943  Weiland _____ 252—419
2,853,455  9/1958  Campbell et al. _____ 252—417

ABRAHAM RIMENS, *Primary Examiner.*

DELBERT E. GANTZ, *Examiner.*